(Model.)

C. GAGE.
ROTARY FAN BLOWER.

No. 244,993. Patented Aug. 2, 1881.

2 Sheets—Sheet 1.

WITNESSES
N. J. Cambridge
Chas. E. Griffin

INVENTOR
Charles Gage
per H. Teschemacher
Atty (Model.)

C. GAGE.
ROTARY FAN BLOWER.

No. 244,993. Patented Aug. 2, 1881.

2 Sheets—Sheet 2.

WITNESSES
W. J. Cambridge
Chas. E. Griffin

INVENTOR
Charles Gage
per R. Teschemacher
Atty

UNITED STATES PATENT OFFICE.

CHARLES GAGE, OF BOSTON, ASSIGNOR TO HIMSELF AND LEWIS B. RUSSELL, OF LYNN, MASSACHUSETTS.

ROTARY FAN-BLOWER.

SPECIFICATION forming part of Letters Patent No. 244,993, dated August 2, 1881.

Application filed April 4, 1881. (Model.)

*To all whom it may concern:*

Be it known that I, CHARLES GAGE, a citizen of the United States, residing at Boston, in the county of Suffolk and State of Massachusetts, have invented certain Improvements in Rotary Fan-Blowers, of which the following is a full, clear, and exact description, reference being had to the accompanying drawings, making part of the specification, in which—

Figure 1:
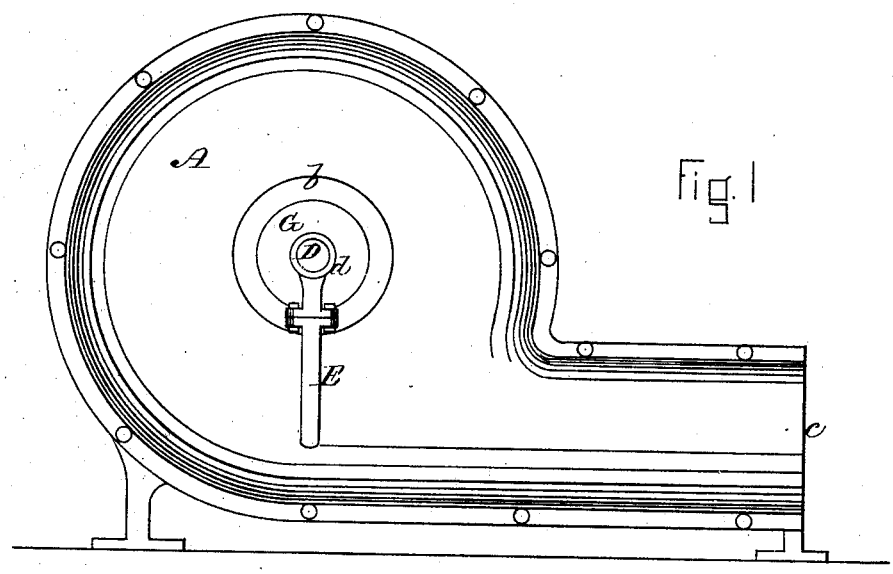
Figure 2:
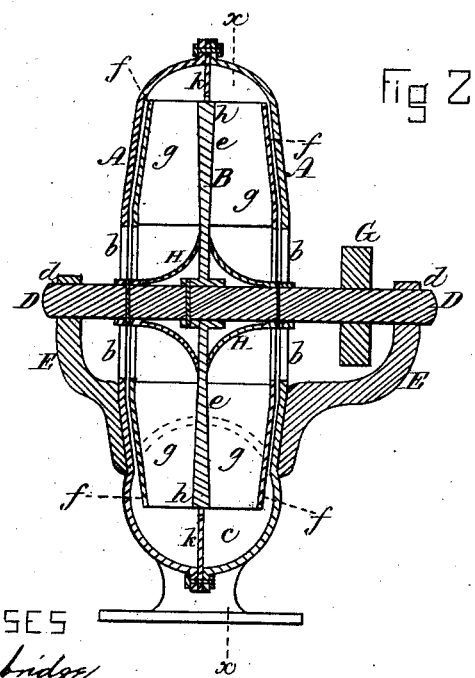
Figure 3:
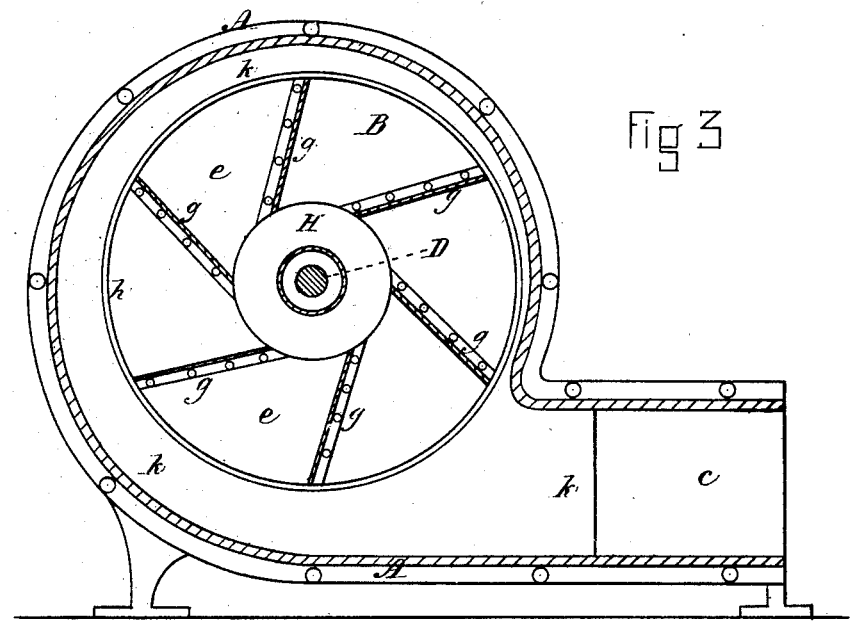
Figure 4:
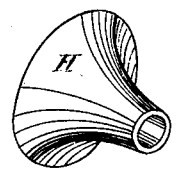
Figure 5:
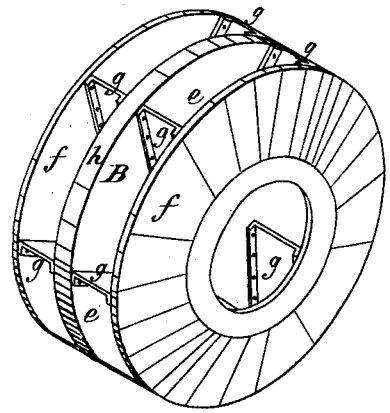

Figure 1 is a side elevation of a rotary fan-blower constructed in accordance with my invention. Fig. 2 is a transverse vertical section through the center of the same. Fig. 3 is a vertical section on the line $xx$ of Fig. 2. Fig. 4 is a perspective view of one of the deflectors detached. Fig. 5 is a perspective view of the blower or fan-wheel removed from the case.

In rotary fan-blowers as heretofore constructed the floats or fans which revolve within the case have been connected with the hub on the driving-shaft by radial arms, the central portion of the case on each side opposite to these arms being open to form air-inlet passages. With this construction the two incoming currents of air entering from opposite sides of the case were brought into direct contact with each other in a direction at right angles to that in which they pass to the floats or fans, which tended to check or diminish the force of the current of air delivered thereto; and, furthermore, this current of air was also still further impeded by the action of the rapidly-revolving radial arms, which tended to break up and obstruct the flow of the air to the floats or fans.

My invention has for its object to overcome these difficulties and objections; and it consists in a rotary fan-blower in which are employed two series of floats or fans connected with the driving-shaft and arranged on opposite sides of a central partition, whereby the two currents of air entering at the center of the case from opposite sides thereof are kept separate from each other, each being acted upon by its respective series of floats or fans, the two currents afterward meeting at or near the eduction-passage or outlet, there being no radial arms to obstruct or interfere in any way with the free passage of the air to the floats or fans.

My invention also consists in the combination, with a rotary fan-blower, of a circular curved deflector of peculiar construction arranged within each side of the casing, at the center, around the driving-shaft, whereby the incoming currents of air are deflected toward the floats or fans and the changing of their direction effected with great facility, while the strength or force of the incoming currents of air is prevented from being diminished by the sudden change of direction at right angles, as would occur were these deflectors not employed.

In the said drawings, A represents the casing of the blower, which is of ordinary form, and provided, as usual, with a central opening, $b$, on each side and a tangential eduction-passage or outlet, $c$. Within this casing revolves the blower or fan-wheel B, which is secured upon the driving-shaft D, the latter running in suitable bearings, $d$, on brackets E, secured to each side of the case A, and having the usual driving-pulley, G, over which the driving-belt passes.

The blower-wheel B consists of a circular disk, $e$, forming a solid central partition, and two annular disks or rings, $ff$, with inclined sides, which are united to the central disk, $e$, by means of the inclined floats or fans $g$ arranged on either of the disk $e$, the wheel being thus divided into two separate portions or halves, each provided with its own series of floats or fans, the partition $e$ being of the full diameter of the wheel and extending through it in a plane at right angles to a plane passing longitudinally through its axis, and consequently the two incoming currents of air, which enter the two central openings, $bb$, from opposite sides of the casing A, are kept entirely separate from each other, each being acted upon by the series of floats or fans on that side of the wheel, the two currents of air uniting at or near the eduction passage or outlet $c$, from which they are simultaneously discharged. I am thus enabled to secure the best results with a minimum expenditure of power, as all liability of the force of the incoming currents of air being checked or diminished by their contact with each other when entering from opposite directions, as heretofore, is entirely avoided, while it will be seen that there are no revolving radial arms or spokes at the center of the wheel to obstruct or break the force of the incoming currents of air, as hitherto, and consequently a blower constructed in accordance with my invention to deliver a given number of cubic feet of air per minute can be driven with much less power than has heretofore been possible with any other construction with which I am acquainted.

The fan-wheel B is preferably made thicker and heavier at or near the periphery of the partition $e$, as seen at $h$, which causes it to act as a balance or fly wheel, and thus run steadier, the reserved force thus stored up enabling the wheel to be maintained at a high rate of speed with less power than where a lighter wheel is employed.

Within the casing A, at the inner periphery, and midway between the sides, is an inwardly-projecting partition, $k$, which fits up close to the periphery of the blower-wheel B and serves to prevent the passage of air from one side to the other of the casing, thus keeping the two currents of air entirely separate from each other until they arrive at or near the eduction-passage or outlet. The annular disks or side rings, $ff$, serve to hold the air and prevent it from escaping into the sides of the casing A, which causes it to be discharged with better effect.

Within each side of the casing A, at the center, is placed a circular curved deflector, H, approximating in form to a cone, as seen in Fig. 4. This deflector encircles the driving-shaft D, and extends from the plane of the side of the casing, or a point a little outside thereof, to the central partition, $e$, of the blower-wheel; and it may be secured to the driving shaft or wheel so as to revolve therewith, or, if preferred, may be attached to arms or supports upon the casing and remain stationary; and by the employment of these deflectors the incoming currents of air are readily deflected toward the floats or fans and their direction of motion changed at a right angle with the greatest facility, which prevents their force from being diminished by a sudden change of direction, as would otherwise occur, thus still further facilitating the ingress of the air and proportionately reducing the amount of power required to operate the blower.

The above-described blower can be arranged to stand vertically, as shown, or it may be arranged in a horizontal position, if found desirable.

It is evident that a blower having the same advantages as above described may be obtained by constructing the casing A with a central stationary partition extending entirely through it in a plane parallel to its sides, and providing two separate series of floats or fans connected with the driving-shaft and arranged on opposite sides of the stationary partition, each series of fans having a solid disk on the side next to the partition and a single annular disk or ring, $f$, to avoid the necessity of employing spokes or radial arms. Such construction, however, I regard as the equivalent of the single blower-wheel first described divided by a central partition, as shown.

What I claim as my invention, and desire to secure by Letters Patent, is—

1. In a rotary fan-blower, the wheel B, constructed without radial arms or spokes and without an opening at the center extending directly through it from side to side, the same consisting of the annular disks or rings $ff$ and the central partition, $e$, united by two independent series of floats or fans arranged on opposite sides of the partition, substantially as and for the purpose described.

2. In a rotary fan-blower, the combination, with the case A and blower-wheel B, with its central partition, $e$, of the partition $k$, extending from the interior of the case to, or nearly to, the periphery of the wheel B, substantially as and for the purpose set forth.

3. The combination, with a rotary fan-blower, of a circular curved deflector, H, arranged within the central opening, $b$, and encircling and having its convex side toward the driving-shaft D, for the purpose of changing the direction of the incoming current of air without diminishing the force thereof, substantially as described.

Witness my hand this 31st day of March, A. D. 1881.

CHARLES GAGE.

In presence of—
P. E. TESCHEMACHER,
W. J. CAMBRIDGE.